United States Patent
Baba et al.

(10) Patent No.: US 10,868,299 B2
(45) Date of Patent: Dec. 15, 2020

(54) NON-AQUEOUS ELECTROLYTE SECONDARY BATTERY

(71) Applicant: Panasonic Intellectual Property Management Co., Ltd., Osaka (JP)

(72) Inventors: Yasunori Baba, Hyogo (JP); Takashi Ko, Hyogo (JP); Fumiharu Niina, Hyogo (JP); Katsunori Yanagida, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 55 days.

(21) Appl. No.: 16/343,227

(22) PCT Filed: Oct. 19, 2017

(86) PCT No.: PCT/JP2017/037784
§ 371 (c)(1),
(2) Date: Apr. 18, 2019

(87) PCT Pub. No.: WO2018/079391
PCT Pub. Date: May 3, 2018

(65) Prior Publication Data
US 2019/0245200 A1    Aug. 8, 2019

(30) Foreign Application Priority Data
Oct. 31, 2016   (JP) ................. 2016-213050

(51) Int. Cl.
| | | |
|---|---|---|
| *H01M 4/36* | (2006.01) | |
| *H01M 4/485* | (2010.01) | |
| *H01M 4/505* | (2010.01) | |
| *H01M 4/525* | (2010.01) | |
| *H01M 10/0525* | (2010.01) | |
| *H01M 4/131* | (2010.01) | |
| *H01M 4/02* | (2006.01) | |

(52) U.S. Cl.
CPC ........... *H01M 4/364* (2013.01); *H01M 4/131* (2013.01); *H01M 4/36* (2013.01); *H01M 4/485* (2013.01); *H01M 4/505* (2013.01); *H01M 4/525* (2013.01); *H01M 10/0525* (2013.01); *H01M 2004/021* (2013.01); *Y02E 60/10* (2013.01); *Y02T 10/70* (2013.01)

(58) Field of Classification Search
CPC ........ H01M 4/364; H01M 4/131; H01M 4/36; H01M 4/485; H01M 4/505; H01M 10/0525; H01M 4/525; H01M 2004/021; H01M 2004/028; Y02E 60/122; Y02T 10/7011

See application file for complete search history.

(56) References Cited

U.S. PATENT DOCUMENTS

| | | | |
|---|---|---|---|
| 6,878,489 B2 * | 4/2005 | Nanjundaswamy .... | H01M 4/34 429/219 |
| 2013/0330613 A1 * | 12/2013 | Saruwatari ............ | H01M 4/525 429/211 |
| 2014/0356718 A1 | 12/2014 | Ito et al. | |
| 2018/0219212 A1 * | 8/2018 | Seol ...................... | H01M 4/505 |

FOREIGN PATENT DOCUMENTS

| | | |
|---|---|---|
| JP | 10-162860 A | 6/1998 |
| JP | 2011-181367 A | 9/2011 |
| JP | 2014-32803 A | 2/2014 |
| WO | 2013/115390 A1 | 8/2003 |
| WO | 2012/111813 A1 | 8/2012 |

OTHER PUBLICATIONS

International Search Report dated Jan. 23, 2018, issued in counterpart International Application No. PCT/JP2017/037784 (2 pages).

* cited by examiner

*Primary Examiner* — Muhammad S Siddiquee
(74) *Attorney, Agent, or Firm* — Westerman, Hattori, Daniels & Adrian

(57) ABSTRACT

The present invention relates to a non-aqueous electrolyte secondary cell comprising: a positive electrode having a positive electrode mixture layer that contains a first positive-electrode active material and a second positive-electrode active material; a negative electrode containing a lithium-titanium composite oxide as a negative-electrode active material; and a non-aqueous electrolyte. The volume per mass of pores in the first positive-electrode active material having a pore diameter of 100 nm or less is four or more times the volume per mass of pores in the second positive-electrode active material having a pore diameter of 100 nm or less. The content of the first positive-electrode active material is 30 mass % or less with respect to the total amount of the first positive-electrode active material and the second positive-electrode active material.

3 Claims, 2 Drawing Sheets

NON-AQUEOUS ELECTROLYTE SECONDARY BATTERY

TECHNICAL FIELD

The present disclosure relates to a non-aqueous electrolyte secondary battery, and more specifically to a positive electrode thereof.

BACKGROUND ART

On mobile digital assistants such as mobile phones, laptop computers, and smartphones, reduction in size and weight has been rapidly progressing in recent years, and a larger capacity is demanded of their secondary batteries as a power source for driving.

A non-aqueous electrolyte secondary battery, which achieves charge and discharge by movement of lithium ions between positive and negative electrodes, has a high energy density and a large capacity, and is thus used widely as a power source for driving mobile digital assistants.

More recently, a non-aqueous electrolyte secondary battery has attracted attention as a power source for engines of electric tools, electric vehicles (EV), hybrid electric vehicles (HEV, PHEV), and the like, and thus wider spread use thereof is expected. Of such power sources for engines, demanded are a large capacity that enables long time use, improvement in output characteristics when high current charge and discharge are carried out repeatedly in a relatively short time, and improvement in durability characteristics that enable repetitive usage for a long time period.

Known is a non-aqueous electrolyte secondary battery using lithium titanate as a negative electrode active material. For example, Patent Literature 1 discloses that a non-aqueous electrolyte secondary battery, which includes a positive electrode containing a positive electrode active material composed of a lithium composite metal oxide having a BET specific surface area of 2 to 30 m²/g, and a negative electrode containing a negative electrode active material composed of lithium titanate represented by a formula: $Li_{4+a}Ti_5O_{12}$, is superior in charging characteristics when the battery is charged at a high current rate (high rate), and can be more quickly charged, compared to a non-aqueous electrolyte secondary battery using a negative electrode containing a negative electrode active material composed of graphite.

CITATION LIST

Patent Literature

PATENT LITERATURE 1: Japanese Patent Laid-Open Publication No. 2011-181367

SUMMARY

However, in a non-aqueous electrolyte secondary battery that comprises a positive electrode containing a lithium composite metal oxide as a positive electrode active material, and a negative electrode containing a lithium-titanium composite oxide as a negative electrode active material, durability against high-rate charge/discharge cycles of the non-aqueous electrolyte secondary battery is insufficient.

An object of the present disclosure is to provide a non-aqueous electrolyte secondary battery that can attain improvement in durability against high-rate charge/discharge cycles.

A non-aqueous electrolyte secondary battery that is one aspect of the present disclosure, comprises: a positive electrode having a positive electrode mixture layer containing a first positive electrode active material and a second positive electrode active material; a negative electrode containing a lithium-titanium composite oxide as a negative electrode active material; and a non-aqueous electrolyte. The first positive electrode active material has a pore volume, of pores each having a pore diameter of 100 nm or less, per mass of 8 mm³/g or more, and the second positive electrode active material has a pore volume, of pores each having a pore diameter of 100 m or less, per mass of 5 mm³/g or less. The pore volume, of pores each having a pore diameter of 100 nm or less, per mass of the first positive electrode active material is 4 or more times the pore volume, of pores each having a pore diameter of 100 nm or less, per mass of the second positive electrode active material, and the content of the first positive electrode active material is 30 mass % or less based on the total amount of the first positive electrode active material and the second positive electrode active material.

According to the non-aqueous electrolyte secondary battery of one aspect of the present disclosure, improvement in durability against high-rate charge/discharge cycles may be attained.

DESCRIPTION OF EMBODIMENTS

As a result of earnest studies, the inventors of the present application have found that in a non-aqueous electrolyte secondary battery comprising a negative electrode containing a lithium-titanium composite oxide as a negative electrode active material, when a positive electrode has a positive electrode mixture layer containing a first positive electrode active material and a second positive electrode active material, each having a specific pore volume, of pores each having a pore diameter of 100 n or less, per mass, and also the content of the first positive electrode active material is 30 mass % or less based on the total amount of the first positive electrode active material and the second positive electrode active material, durability against high-rate charge/discharge cycles can be improved.

Hereinafter, exemplary embodiments of the present disclosure will be described in detail with reference to the drawings. The non-aqueous electrolyte secondary battery of the present disclosure is not limited to the embodiments described below. The drawings referred for the description of embodiments are schematically illustrated, and the dimensions and the like of the components should be determined in consideration of the description below.

[Non-Aqueous Electrolyte Secondary Battery]

Figure 1:
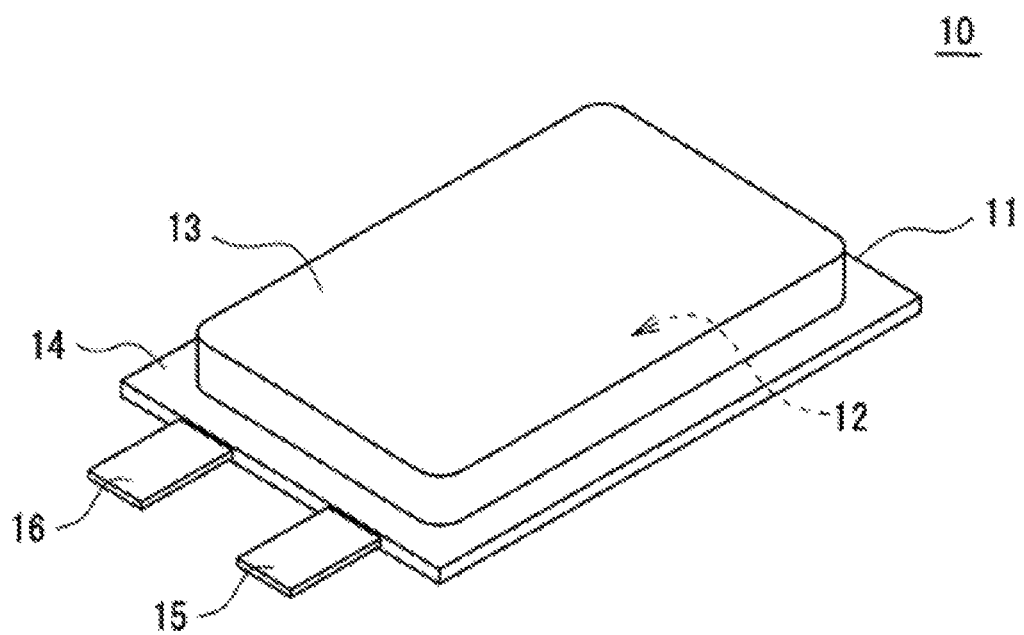
FIG. 1 is a perspective view schematically showing a non-aqueous electrolyte secondary battery as one exemplary embodiment.

Using FIG. 1 and FIG. 2, the configuration of a non-aqueous electrolyte secondary battery 10 will be described. FIG. 1 is a perspective view of the non-aqueous electrolyte secondary battery 10 as one example of the embodiments. As exemplified in FIG. 1, the non-aqueous electrolyte secondary battery 10 includes a battery case 11 and a power generation element housed in the battery case 11. The power generation element includes an electrode assembly 12 having a wound structure, and a non-aqueous electrolyte (not shown). A preferred example of the non-aqueous electrolyte secondary battery 10 is a lithium ion battery.

The battery case 11 includes, for example, two laminate sheets. It is preferable to use sheets, each provided with resin layers formed on both sides of a metal layer, and each of the resin layers in contact with each other is preferably composed of a resin capable of being thermos-compression bonded. The metal layer is, for example, a thin film layer of aluminum, and has a function of preventing permeation of moisture or the like. An exterior body for housing the power generation element is not limited to one configured by a laminate sheet, and may be a metallic case in a shape, such as a cylindrical shape (cylindrical battery), a rectangular shape (rectangular battery), and a coin shape (a coin battery).

The battery case 11 includes a housing part 13 for storing the above-described power generation element, and a sealed part 14 formed around the periphery of the housing part 13. One of the laminate sheets included in the battery case 11 is formed into a cup shape so as to form the housing part 13 in a substantially flat rectangular parallelepiped shape, on the film. The housing part 13 is formed in such a manner that one of the laminate sheets, facing each other, is subjected to drawing to be formed in a projecting shape projecting to the opposite side to the other laminate sheet. The sealed part 14 is formed by thermally bonding respective end parts of the respective laminate sheets, to seal the internal space of the housing part 13 in which the power generation element is housed.

The non-aqueous electrolyte secondary battery 10 includes a pair of electrode terminals (a positive electrode terminal 15 and a negative electrode terminal 16) led out from the battery case 11. The positive electrode terminal 15 and the negative electrode terminal 16 are led out from an end part of the battery case 11. Each of the positive electrode terminal 15 and the negative electrode terminal 16 is a substantially flat plate-like body, is bonded to each of the laminate sheets at the sealed part 14, and is led out, through the sealed part 14, from between the respective films to the outside of the battery case 11.

Figure 2:
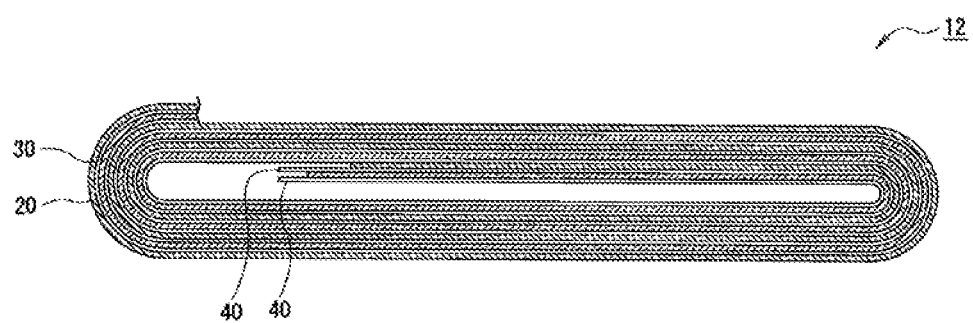
FIG. 2 is a sectional view showing an electrode assembly configuring the non-aqueous electrolyte secondary battery as one exemplary embodiment.

FIG. 2 is a cross-sectional view of the electrode assembly 12 included in the non-aqueous electrolyte secondary battery 10. As shown in FIG. 2, the electrode assembly 12 has a wound structure in which a positive electrode 20 and a negative electrode 30 are wound together with a separator 40 therebetween. The electrode assembly 12 has a flat shape formed by being press-molded from a direction orthogonal to the center axis of the wound structure. The structure of the electrode assembly is not limited to the wound structure, and a plurality of positive electrodes and a plurality of negative electrodes may be alternately laminated with separators interposed therebetween.

Hereinafter, each of the components, particularly the positive electrode 20 and the negative electrode 30, of the non-aqueous electrolyte secondary battery 10 will be described below.

[Positive Electrode]

The positive electrode 20 for a non-aqueous electrolyte secondary battery includes, for example, a positive electrode collector such as metal foil and a positive electrode mixture layer formed on the positive electrode collector. Foil of a metal, such as aluminum, that is stable in the electric potential range of the positive electrode 20, a film with such a metal disposed as an outer layer, and the like can be used for the positive electrode collector. The positive electrode mixture layer contains the positive electrode active material, a conductive agent, and a binder. The positive electrode 20 can be produced by, for example, applying a positive electrode mixture slurry containing the positive electrode active material, the conductive agent, the binder, and other components to the positive electrode collector, drying the resulting applying film, and rolling the resulting product to form the positive electrode mixture layer on each side of the collector.

Examples of the conductive agent included in the positive electrode mixture layer include carbon materials such as carbon black, acetylene black, Ketjenblack, and graphite. These may be used singly or in combinations of two or more thereof.

Examples of the binder included in the positive electrode mixture layer include fluoro resins, such as polytetrafluoroethylene (PTFE) and poly (vinylidene fluoride) (PVdF), polyacrylonitrile (PAN), polyimides, acrylic resins, polyolefins, and others. These resins may be combined with carboxymethyl cellulose (CMC) or a salt thereof, poly(ethylene oxide) (PEO), or the like. These may be used singly or in combinations of two or more thereof.

The positive electrode mixture layer contains the first positive electrode active material and the second positive electrode active material as the positive electrode active material. The first positive electrode active material has a pore volume, of pores each having a pore diameter of 100 nm or less, per mass of 8 $mm^3/g$ or more, and the second positive electrode active material has a pore volume, of pores each having a pore diameter of 100 nm or less, per mass of 5 $mm^3/g$ or less. The ratio of the pore volume, of pores each having a pore diameter of 100 nm or less, per mass of the first positive electrode active material to the pore volume, of pores each having a pore diameter of 100 nm or less, per mass of the second positive electrode active material is 4 times or more. In addition, the content of the first positive electrode active material is 30 mass % or less, based on the total amount of the first positive electrode active material and the second positive electrode active material.

In the present specification, "a pore volume, of pores each having a pore diameter of 100 nm or less, per mass" of a positive electrode active material is also referred to as a "100 nm or less pores volume", and "the ratio of the pore volume, of pores each having a pore diameter of 100 nm or less, per mass of the first positive electrode active material to the pore volume, of pores each having a pore diameter of 100 nm or less, per mass of the second positive electrode active material" is also referred to as "the first/second pore volume ratio".

The 100 nm or less pores volume of a positive electrode active material can be measured according to a known method; and for example, a pore distribution curve is prepared according to the BJH method based on measurement results of the amount of nitrogen adsorbed on a positive electrode active material with respect to the nitrogen gas pressure as determined according to the nitrogen adsorption method, and the total volume of pores having a pore diameter within a range of 100 n or less is determined by summing up the volumes of 100 nm or less pores of the positive electrode active material. The BJH method is a method in which a pore volume corresponding to a pore diameter is calculated using a pore model having a cylindrical shape to determine a pore distribution. The pore distribution according to the BJH method can be determined using, for example, a device for measuring an amount of a gas adsorbed (manufactured by Quantachrome Corporation).

Both the first positive electrode active material and the second positive electrode active material, which are each contained as a positive electrode active material in the positive electrode mixture layer, are lithium-containing transition metal oxide. The lithium-containing transition metal oxide is a metal oxide containing at least lithium (Li) and a transition metal element. The lithium-containing transition metal oxide may contain an additive element other than lithium (Li) and the transition metal element.

As the principle that the non-aqueous electrolyte secondary battery 10 according to the present embodiment has been improved in durability against high-rate charge/discharge cycles, the following can be considered. The non-aqueous electrolyte secondary battery 10 according to the present embodiment comprises the negative electrode 30 containing a lithium-titanium composite oxide as the negative electrode active material. Since the lithium-titanium composite oxide has a high charge/discharge efficiency, the lower limit of the potential dischargeable at the positive electrode becomes lower, compared to a case where the negative electrode active material including a conventional carbon material is used. Because expansion and shrinkage of active material particles are further increased when charge/discharge is performed at a higher depth, it is conceivable that, due to repetitive charge/discharge cycles at a higher depth, cracks (fissures) in particles of the positive electrode active material are accelerated, and thus widths of the cracks are also increased. It is conceivable that, due to this, in the non-aqueous electrolyte secondary battery using a lithium-titanium composite oxide as the negative electrode active material, compared to a case where the negative electrode active material including a conventional carbon material is used, internal resistance of the non-aqueous electrolyte secondary battery becomes increased. In a positive electrode active material having a small specific surface area, influence of expansion and contraction is likely to occur; therefore, a problem of in resistance due to cracks of particles is more serious.

To the contrary, as described above, the non-aqueous electrolyte secondary battery 10 according to the present embodiment includes, as the positive electrode active material, the first positive electrode active material and the second positive electrode active material, each having a specific pore volume of 100 nm or less, in a specific content. When there are pores, each having a pore diameter of 100 nm or less in the positive electrode active material, the effective reaction area increases and also the diffusion length of a Li ion in solid can be significantly decreased, in the positive electrode active material, thus, the high-rate characteristics of the battery can be improved. Since the positive electrode 20 according to the present embodiment includes the first positive electrode active material having a 100 nm or less pores volume of 8 $mm^3/g$ or more, and the second positive electrode active material having a 100 nm or less pores volume of 3 $mm^3/g$ or less, it is conceivable that a charging reaction preferentially occurs in the first positive electrode active material, and as a result, a high oxidation state is obtained, as compared to the second positive electrode active material, thus, the reaction activity becomes higher.

At this time, as the non-aqueous electrolyte present in the vicinity of the first positive electrode active material comes into contact with the first positive electrode active material in a high oxidation state, the non-aqueous electrolyte is oxidatively decomposed. As the oxidation decomposition product of the non-aqueous electrolyte is diffused and adhered to the nearby positive electrode active material, a film is formed on the surface of the positive electrode active material. It can be considered that this film reduces generation and acceleration of cracks in the positive electrode active material particles due to repetitive charge/discharge cycles, to thereby suppress increase in resistance of the positive electrode active material caused by repetitive charge/discharge cycles, which contributes to improvement in durability against the high-rate charge/discharge cycles of the non-aqueous electrolyte secondary battery 10.

In the meantime, the charging reaction is likely to uniformly occur in the whole the positive electrode mixture layer when the positive electrode active material contains only the first positive electrode active material having a 100 nm or less pores volume of 8 $mm^3/g$ or more; therefore, such a situation that the charging reaction is biased only to a part of the positive electrode active material in the positive electrode mixture layer is unlikely to occur. Hence, when the positive electrode 20 contains only the first positive electrode active material as the positive electrode active material, the amount of the positive electrode active material that comes into a highly oxidized state is very small, and thus oxidation decomposition of the non-aqueous electrolyte and film formation due to the oxidative decomposition product hardly occur. As a result, it can be considered that generation and acceleration of cracks in the positive electrode active material particles are not suppressed, so that the non-aqueous electrolyte secondary battery 10 is not improved in durability against the high-rate charge/discharge cycles of the non-aqueous electrolyte secondary battery 10. Also in the case where the positive electrode 20 contains only the second positive electrode active material as the positive electrode active material, for the same reason as described above, it is conceivable that the non-aqueous electrolyte secondary battery 10 is not improved in durability against the high-rate charge/discharge cycles of the non-aqueous electrolyte secondary battery 10.

For the reason described above, in the non-aqueous electrolyte secondary battery 10 according to the present embodiment, the positive electrode mixture layer includes, as the positive electrode active material, the first positive electrode active material having a pore volume, of pores each having a pore diameter of 100 nm or less, per mass of 8 $mm^3/g$ or more, and the second positive electrode active material having a pore volume, of pores having a pore diameter of 100 nm or less, per mass of 5 $mm^3/g$ or less, and the content of the first positive electrode active material is set to be 30 mass % b or less, based on the total amount of the first positive electrode active material and the second positive electrode active material. In light of balance between promotion of film formation by oxidation decomposition reaction of the non-aqueous electrolyte, and uniform formation of this film in the positive electrode mixture layer, the content of the first positive electrode active material is preferably 3 mass % or more and 30 mass % or less based on the total amount of the first positive electrode active material and the second positive electrode active material, and more preferably 5 mass % or more and 30 mass % or less. This is particularly preferable 5 mass % or more and 20 mass % or less.

Furthermore, the non-aqueous electrolyte secondary battery 10 according to the present embodiment is characterized in that, in each of the first positive electrode active material and the second positive electrode active material, the first/second pore volume ratio is less than 4 times. It is conceivable that, if the first/second pore volume ratio is less than 4 times, which means that the 100 nm or less pores volume of the first positive electrode active material is close to the 100 nm or less pores volume of the second positive electrode active material, it is probably difficult that the charging reaction occurs predominantly in the first positive electrode active material, and therefore, it is also difficult that the first positive electrode active material becomes highly oxidized state.

For example, the upper limit of the 100 nm or less pores volume of the first positive electrode active material is preferably, but not limited to, 100 mm$^3$/g or less, more preferably 50 mm$^3$/g or less. The 100 nm or less pores volume of the first positive electrode active material is preferably, 10 mm$^3$/g or more, more preferably 15 mm$^3$/g or more. The lower limit of the 100 nm or less pores volume of the second positive electrode active material is not limited and 0 mm$^3$/g or more. The 100 nm or less pores volume of the second positive electrode active material is more preferably 3 mm$^3$/g or less, even more preferably 2 mm$^3$/g or less.

The first positive electrode active material and the second positive electrode active material are each preferably a lamellar lithium transition metal oxide, which has a lamellar crystal structure. Examples thereof include a lamellar lithium transition metal oxide represented by a general formula (1): $Li_{1+x}M_aO_{2+b}$, wherein x, a, and b meet the following conditions: a=1, −0.2≤x≤0.4, and −0.1≤b≤0.4, and M represents metal elements including at least one element selected from the group consisting of nickel (Ni), cobalt (Co), manganese (Mn), and aluminum (Al). The lamellar lithium transition metal oxide is likely to become highly oxidized state when a lithium ion is abstracted in the charging reaction, resulting in that oxidative decomposition of the non-aqueous electrolyte and the film formation described above are likely to occur, to thereby remarkably exhibit the effect of improving durability against high-rate charge/discharge cycles of the non-aqueous electrolyte secondary battery 10. As the lamellar lithium transition metal oxide, lithium nickel cobalt manganese oxide represented by the above general formula (1) and including Ni, Co, and Mn as M is particularly preferable.

The lamellar lithium transition metal oxide may contain another additive element in addition to Ni, Co, Mn, and Al, and examples thereof include an alkali metal element other than Li, a transition metal element other than Mn, Ni and Co, an alkaline earth metal element, a group 12 element, a group 13 element other than Al, and a Group 14 element. Specific examples of the other additive element include zirconium (Zr), boron (B), magnesium (Mg), titanium (Ti), iron (Fe), copper (Cu), zinc (Zn), tin (Sn), sodium (Na), potassium (K), barium (Ba), strontium (Sr), calcium (Ca), tungsten (W), molybdenum (Mo), niobium (Nb), and silicon (Si), etc.

The lamellar lithium transition metal oxide suitably contains Zr. This is because it is conceivable that, when containing Zr, the lamellar lithium transition metal oxide has a stabilized crystal structure to thereby improve durability of the positive electrode mixture layer at a high temperature and cyclic characteristics. The Zr content of the lamellar lithium-containing transition metal oxide is preferably 0.05 mol % or more and 10 mol % or less, more preferably 0.1 mol % or more and 5 mol % or less, particularly preferably 0.2 mol % or more and 3 mol % or less, based on the total amount of metals excluding Li.

The composition of compounds used as the positive electrode active material and the negative electrode active material can be measured by using an IP emission spectroscopic analyzer (e.g. "iCAP6300" (product name) manufactured by Thermo Fisher Scientific, Inc.)

The synthesizing method for the lamellar lithium transition metal oxide used as the first positive electrode active material and the second positive electrode active material will be described. For example, a lithium-containing compound such as lithium hydroxide and an oxide that is obtained by firing a hydroxide containing a metal element other than lithium represented by M in the above general formula (1) are mixed in a desired mixing ratio, and the mixture is fired, to thereby synthesize secondary particles, which are formed of agglomerated primary particles, of the lamellar lithium transition metal oxide represented by the above general formula (1). Firing the mixture is carried out in the atmosphere or in an oxygen stream. The firing temperature is about 500 to 1100° C., and the firing time is about 1 to 30 hours when the firing temperature is 500 to 1100° C.

The 100 nm or less pores volume of the lamellar lithium transition metal oxide used as the first positive electrode active material or the second positive electrode active material can be adjusted when the hydroxide containing the metal element M is prepared, for example. The hydroxide containing the metal element M can be obtained by, for example, dropping an alkali aqueous solution, such as a sodium hydroxide aqueous solution, into an aqueous solution containing a compound of the metal element M, and stirring the resultant, and at this time, the temperatures of the aqueous solutions, the time duration for dropping the alkali aqueous solution, the stirring rate, pH, and the other conditions are adjusted.

For example, the particle diameter of the first positive electrode active material and the particle diameter of the second positive electrode active material are each preferably, but not limited to, 2 μm or more and 30 μm or less in terms of the average particle diameter. If the average particle diameter of the first positive electrode active material and the average particle diameter of the second positive electrode active material are each 2 μm or less, the conductive path formed of the conductive agent in the positive electrode mixture layer may be impaired to thereby deteriorate the high-rate cyclic characteristics. On the other hand, if the average particle diameter of the first positive electrode active material and the average particle diameter of the second positive electrode active material are each 30 μm or more, the reaction area may decrease to thereby deteriorate the loading characteristics. When the first positive electrode active material and the second positive electrode active material are secondary particles formed by aggregation of the primary particles, the average particle size of the secondary particles of the first positive electrode active material and the second positive electrode active material is preferably within the above range.

The average particle diameter of the positive electrode active material means a volume average particle diameter measured by the laser diffraction method, which means a median diameter at which the cumulative volume is 50% in the particle diameter distribution. The average particle diameter of the positive electrode active material can be measured using, for example, a laser diffraction/scattering particle diameter distribution analyzer (manufactured by HORIBA. Ltd.).

In the non-aqueous electrolyte secondary battery 10 according to the present embodiment, it is preferable that the content of the first positive electrode active material contained in a region ranging from a surface (surface opposite to the surface in contact with the collector) to the center in the thickness direction of the positive electrode mixture layer is 60 mass % or more, based on the total amount of the first positive electrode active material contained in the positive electrode mixture layer. In the present specification, the region ranging from the surface to the center in the thickness direction of the positive electrode mixture layer, in other words, the region located on the surface side of two regions into which the positive electrode mixture layer is divided in the thickness direction, is also referred to as a "surface-side region". The content of the first positive electrode active material contained in the surface side region based on the total amount of the first positive electrode active material contained in the positive electrode mixture layer is also referred to as a "surface-side content ratio of the first positive electrode active material". The reason why the surface-side content ratio of the first positive electrode active material is preferably 60 mass % or more will be described below.

Cracks in the positive electrode active material particles caused by repetitive charge/discharge cycles in the non-aqueous electrolyte secondary battery 10 can be caused in the entire range regardless of the thickness direction of the positive electrode mixture layer, and the positive electrode active material particles are more likely to be subjected to corrosion by the non-aqueous electrolyte as those particles are closer to the surface; thus the cracks in the particles tend to easily occur. In the non-aqueous electrolyte secondary battery 10, when the surface-side content of the first positive electrode active material is increased to 60 mass % or more, a film formed of an oxidative decomposition product containing more non-aqueous electrolyte is formed in the positive electrode active material present closer to the surface of the positive electrode mixture layer, due to increase of the first positive electrode active material in a high oxidation state. As a result, it can be considered that the effect of suppressing cracks in the positive electrode active material particles present closer to the surface as well as acceleration of the cracks is improved so as to further improve durability against the high-rate charge/discharge cycles of the non-aqueous electrolyte secondary battery 10. From the above viewpoint, the surface-side content of the first positive electrode active material is preferably 60 mass % or more, and more preferably 65 mass % or more.

The upper limit of the surface-side content of the first positive electrode active material is not particularly limited, but if the content of the first positive electrode active material in the surface side region becomes excessive, the oxidation reaction does not concentrate on a part of the first positive electrode active material, and thus the first positive electrode active material in a high oxidation state may hardly be obtained- and of the positive electrode mixture layer, in the positive electrode active material present closer to the surface in contact with the positive electrode collector, formation of a film by an oxidative decomposition product of the non-aqueous electrolyte may be reduced; and for these reasons and others, the upper limit is preferably 80 mass % or less.

The measuring method for the surface-side content of the first positive electrode active material may include, for example, the following method. Of the positive electrode 20 including the positive electrode collector and the positive electrode mixture layer, a surface side region of the positive electrode mixture layer is cut off by using a cutting tool or the like, on the basis of the thickness of the positive electrode mixture layer measured in advance, and this piece is subjected to centrifugal separation using a centrifugal separator so as to separate the first positive electrode active material; and thereafter, the mass of the first positive electrode active material is measured. The positive electrode mixture layer present on the positive electrode collector side, which is left in the positive electrode 20 after the cut-off, is subjected to the same processing as described above so as to measure the mass of the first positive electrode active material. From these measurement results, the surface-side content of the first positive electrode active material is obtained.

As other methods, the followings may be listed. A cross section of the positive electrode mixture layer in the positive electrode 20 is formed by Cross-section Polisher or the like, and based on a cross sectional image obtained by observing the cross section with a scanning electron microscope (SEM), the number of particles and an average diameter of the particles contained in the surface side region and the whole of the positive electrode mixture layer. From these measurement results, a volume ratio of the first positive electrode active material contained in the surface side region, based on the first positive electrode active material contained in the whole positive electrode mixture layer is calculated, to thereby obtain the surface-side content of the first positive electrode active material.

In the above-described measuring method for the surface-side content of the first positive electrode active material, when the surface side region is cut off from the positive electrode mixture layer of the positive electrode 20, the cutting surface does not necessarily coincide with the center in the thickness direction of the positive electrode mixture layer, and the cutting surface may be included within a range of 40% or more and 60% or less in the thickness direction of the positive electrode mixture layer. Furthermore, when there is a large difference between the total amount of a first mixture obtained by cutting off the positive electrode mixture layer present on the surface side and the total amount of a second mixture obtained by cutting off the positive electrode mixture layer present on the positive electrode collector side, a value of the surface-side content of the first positive electrode active material may be corrected based on the total amount (mass) of each mixture.

The positive electrode 20 according to the present embodiment may be produced, for example, by mixing the first positive electrode active material, the second positive electrode active material, a conductive agent, and a binder, and thereafter adding a dispersion medium such as an n-methyl-2-pyrrolidone (NMP) so as to prepare a positive electrode mixture slurry; and subsequently, applying the positive electrode mixture slurry on the positive electrode collector, and then drying the applying film, and thereafter rolling this, to thus form the positive electrode mixture layer on both surfaces of the collector.

The positive electrode 20 according to the present embodiment is produced by a method including; for example, (1) a slurry preparing step of preparing a first slurry that contains the first positive electrode active material, the second positive electrode active material, a conductive agent, and a binder, and a second slurry that contains the first positive electrode active material the second positive electrode active material, the conductive agent, and the binder, and has a different content between the first positive electrode active material and the second positive electrode active material from that of the first slurry; (2) a first applying step of applying the first slurry to the surface of the positive electrode collector so as to form a first applying layer; (3) a first drying step of drying the first applying layer formed on the positive electrode collector so as to form the first positive electrode mixture layer, (4) a second applying step of applying the second slurry on the surface of the first positive electrode mixture layer so as to form a second applying layer; (5) a second drying step of drying the second applying layer so as to form the second positive electrode mixture layer, and (6) a rolling step of rolling the first positive electrode mixture layer and the second positive electrode mixture layer. At this time, the content of the first positive electrode active material in each of the first slurry and the second slurry, and the applying amount of the first slurry and the second slurry (i.e. the thicknesses of the first positive electrode mixture layer and the second positive electrode mixture layer), and others are adjusted such that the content of the first positive electrode active material contained in a region ranging from the surface to the center in the thickness direction of the positive electrode mixture layer (a surface-side positive electrode mixture layer) is set to be 60 mass % or more based on the total amount of the first positive electrode active material contained in the positive electrode mixture layer.

The method of applying the first slurry to the surface of the positive electrode collector in the first applying step, and the method of applying the second slurry to the surface of the first positive electrode mixture layer in the second applying step are not particularly limited, and the application can be carried out by using a well-known applying device, such as a gravure coater, a slit coater, and a die coater.

The positive electrode mixture layer may contain another positive electrode active material in addition to the first positive electrode active material and the second positive electrode active material. The percentage by mass of the first positive electrode active material and the second positive electrode active material is preferably, but not limited to, 10 mass % or more and 100 mass % or less, more preferably 20 mass % or more and 100 mass % or less, even more preferably 60 mass % or more and 100 mass % or less, based on the total amount of the positive electrode active material. A positive electrode active material other than the first positive electrode active material and the second positive electrode active material is not particularly limited as long as it is a compound that can reversibly intercalate and deintercalate lithium, and examples thereof include compounds having a crystal structure, such as a layered structure, a spinel structure, or an olivine structure, that can intercalate and deintercalate lithium ions while retaining its stable crystal structure.

[Negative Electrode]

The negative electrode 30 includes, for example, a negative electrode collector formed of a metal foil, for example, and a negative electrode mixture layer formed on the negative electrode collector. Foil of a metal, such as aluminum, that is stable in the electric potential range of the negative electrode 30, a film with such a metal disposed on an outer layer, and the like can be used for the negative electrode collector. The negative electrode mixture layer contains a negative electrode active material and a binder. The negative electrode 30 can be produced by, for example, applying a negative electrode mixture slurry containing the negative electrode active material, the binder, and other components to the negative electrode collector, drying the resulting applying film, and rolling the resulting product to form a negative electrode mixture layer on each side of the collector.

The negative electrode 30 according to the present embodiment contains a lithium-titanium composite oxide as the negative electrode active material. A lithium-titanium composite oxide is represented by a general formula (2) $Li_{4+y}Ti_5O_{12}$ (in the general formula (2), y is 0 or more and 1 or less), and has a spinel type crystal structure.

The negative electrode active material composed of the lithium titanium composite oxide can be synthesized by a method conforming to the method of synthesizing the lamellar lithium transition metal oxide. For example, a lithium-containing compound such as lithium hydroxide and a titanium containing compound such as titanium dioxide and titanium hydroxide are mixed at a desired mixing ratio, and the mixture is fired, to thereby obtain secondary particles, which are formed of agglomerated primary particles, of the lithium titanium composite oxide represented by the above general formula (2). Firing the mixture is carried out in the atmosphere or in an oxygen stream. The firing temperature is about 500 to 1100° C., and the firing time is about 1 to 30 hours when the firing temperature is 500 to 1100° C.

As a negative electrode active material, the negative electrode 30 may include, other than a lithium-titanium composite oxide, a compound that can reversibly intercalate and deintercalate lithium ions, like carbon materials such as natural graphite and artificial graphite, a metal that can be alloyed with lithium such as Si and Sn, or the like.

As the binder used for the negative electrode 30, any well-known binder can be used, and similarly to the case of the positive electrode 20, a fluorocarbon resin such as PTFE, PAN, a polyimide resin, an acrylic resin, a polyolefin resin, or the like can be used. Examples of the binder used when the negative electrode mixture slurry is prepared using an aqueous solvent include CMC and its salts, styrene-butadiene rubber (SBR), poly(acrylic acid) (PAA) and its salts, and poly(vinyl alcohol) (PVA).

[Non-Aqueous Electrolyte]

The non-aqueous electrolyte contains a non-aqueous solvent and an electrolyte salt dissolved in the non-aqueous solvent. Example of the non-aqueous solvent used for the non-aqueous electrolyte include esters, ethers, nitriles, amides such as dimethylformamide, and mixed solvents of two or more of these solvents. A halogen-substituted product formed by replacing at least one hydrogen atom of any of the above solvents with a halogen atom such as fluorine may also be used.

Examples of the esters that may be contained in the non-aqueous electrolyte include cyclic carbonate esters, chain carbonate esters, and carboxylate esters. Specifically, examples thereof include cyclic carbonate esters such as ethylene carbonate (EC), propylene carbonate (PC), butylene carbonate, and vinylene carbonate; chain carbonate esters such as dimethyl carbonate (DMC), methyl ethyl carbonate (MEC), diethyl carbonate (DEC), methyl propyl carbonate, ethyl propyl carbonate, and methyl isopropyl carbonate; chain carboxylate esters such as methyl propionate (MP), ethyl propionate, methyl acetate, ethyl acetate, and propyl acetate; and cyclic carboxylate esters such as γ-butyrolactone (GBL) and γ-valerolactone (GVL). Examples includes cyclic carboxylate esters such as γ-butyrolactone (GBL) and γ-valerolactone (GVL).

Examples of the ethers that may be contained in the non-aqueous electrolyte include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers; and chain ethers such as, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

Examples of the nitriles that may be contained in the non-aqueous electrolyte include acetonitrile, propionitrile, butyronitrile, valeronitrile, n-heptane nitrile, succinonitrile, glutaronitrile, adiponitrile, pimelonitrile, 1,2,3-propane tricarbonitrile, and 1,3,5-pentane tricarbonitrile.

Examples of the halogen-substituted product that may be contained in the non-aqueous electrolyte include a fluorinated cyclic carbonate ester such as 4-fluoroethylene carbonate (FEC), a fluorinated chain carbonate ester, a fluorinated chain carboxylate ester such as methyl 3,3,3-trifluoropropionate (FMP).

The electrolyte salt for the non-aqueous electrolyte is preferably a lithium salt. Examples of the lithium salt include $LiBF_4$, $LiClO_4$, $LiPF_6$, $LiAsF_6$, $LiSbF_6$, $LiAlCl_4$, $LiSCN$, $LiCF_3SO_3$, $LiC(C_2F_5SO_2)$, $LiCF_3CO_2$, $Li(P(C_2O_4)F_4)$, $Li(P(C_2O_4)F_2)$, $LiPF_{6-x}(C_nF_{2n+1})_x$ (where $1 \leq x \leq 6$, and n is 1 or 2), $LiB_{10}Cl_{10}$, LiCl, LiBr, LiI, chloroborane lithium, lithium short-chain aliphatic carboxylates; borate salts such as $Li_2B_4O_7$, $Li(B(C_2O_4)_2)$, [lithium bis(oxalate)borate (LiBOB)], and $Li(B(C_2O_4)F_2)$; and imide salts such as $LiN(FSO_2)_2$ and $LN(C_1F_{2l+1}SO_2)(C_mF_{2m+1}SO_2)$ {where l and m are integers of 1 or more}. These lithium salts may be used singly or in combinations of two or more thereof.

As described above, when coming into contact with the first positive electrode active material in a high oxidation state in the positive electrode mixture layer, the non-aqueous electrolyte is oxidatively decomposed, to thereby form a film of an oxidative decomposition product on the surface of the positive electrode active material. From this viewpoint, it is preferable to use $LiPF_6$ as the non-aqueous electrolyte.

[Separator]

An ion-permeable and insulating porous sheet is used as the separator 40. Specific examples of the porous sheet include a microporous thin film, woven fabric, and nonwoven fabric. Suitable examples of the material for the separator 40 include olefin resins such as polyethylene and polypropylene, and cellulose. The separator 40 may be a laminate including a cellulose fiber layer and a layer of fibers of a thermoplastic resin such as an olefin resin. The separator 40 may be a multi-layered separator including a polyethylene layer and a polypropylene layer, and a separator a surface of which is coated with a resin such as an aramid resin or inorganic fine particles such as alumina and titania may also be used as the separator 40.

EXAMPLES

Hereinafter, the present disclosure will be further described in more details specifically by way of Examples and Comparative Examples, but is not limited to the following Examples.

Example 1

[Production of Positive Electrode]

A lamellar lithium transition metal oxide represented by a composition formula $Li_{1.054}Ni_{0.199}Co_{0.597}Mn_{0.199}Zr_{0.005}O_2$ (a first positive electrode active material A1), a lamellar lithium transition metal oxide represented by a composition formula: $Li_{1.067}Ni_{0.498}Co_{0.199}Mn_{0.299}Zr_{0.005}O_2$ (a second positive electrode active material B1) were mixed in a mixing ratio of 8:92 to obtain a mixture. The 100 nm or less pores volume of the first positive electrode active material A1 was 20 mm$^3$/g, and the 100 nm or less pores volume of the second positive electrode active material B1 was 2 mm$^3$/g, as measured according to the BJH method.

The above mixture, carbon black (conductive agent), and poly (vinylidene fluoride) (PVDF) (binder) were mixed at a mass ratio of 91:7:2. N-methyl-2-pyrrolidone (NMP) as a dispersing mediumn was added to the mixture, and the resultant was stirred using a mixer (T.K. HIVIS MIX, manufactured by PRIMIX Corporation) to prepare a positive electrode mixture slurry (a first slurry C1). Next, the first slurry C1 is applied on an aluminum foil that is the positive electrode collector, and the applying film was dried so as to form the first positive electrode mixture layer.

The positive electrode mixture slurry (second slurry D1) was prepared in the same manner as in the above method, except that the first positive electrode active material A1 and the second positive electrode active material B1 were mixed in a mass ratio of 12:88. Next, the second slurry D1 is applied on the first positive electrode mixture layer formed on the surface of the positive electrode collector so as to have the same thickness as that of the first positive electrode mixture layer, and the applying film was then dried to form the second positive electrode mixture layer. Thereafter, the first positive electrode mixture layer and the second positive electrode mixture layer were rolled by a rolling mill so as to produce a positive electrode E1 formed with the positive electrode mixture layers on both surfaces of the aluminum foil. In the positive electrode E1, the content of the first positive electrode active material A1 relative to the total amount of the first positive electrode active material A1 and second positive electrode active material B1 was 10 mass %. In addition, the surface-side content of the first positive electrode active material A1 in the positive electrode E1 was 60 mass %.

[Production of Negative Electrode]

A lithium titanium composite oxide represented by a compositional formula $Li_4Ti_5O_{12}$, carbon black (conductive agent), and polyvinylidene fluoride (PVDF) were mixed in a mass ratio of 90:8:2. NMP was added to the mixture, and the resultant was stirred using a mixer (TIC. HIVIS MIX, manufactured by PRIMIX Corporation) to prepare a negative electrode mixture slurry. Subsequently, the negative electrode mixture slurry was applied to the aluminum foil as the negative electrode collector, and the applying film was dried and then rolled with a rolling mill to produce the negative electrode having the negative electrode mixture layer formed on each side of the aluminum foil.

[Preparation of Non-Aqueous Electrolyte]

Propylene carbonate (PC), ethyl methyl carbonate (EMC), and dimethyl carbonate (DMC) were mixed in a volume ratio of 25:35:40. $LiPF_6$ was dissolved in the mixed solvent at a concentration of 1.2 mol/L.

[Production of Battery]

An aluminum lead is attached to each of the positive electrode E1 and the negative electrode. A microporous polyethylene film was used as the polypropylene separator 40, the positive electrode E1 and the negative electrode were spirally wound through the separator 40, and a press-molded wound type electrode assembly 12 was thereby produced. This electrode assembly 12 was housed in the battery case 11 formed by an aluminum laminate sheet; and after the non-aqueous electrolyte was injected thereinto, the opening of the battery case 11 was sealed, to thereby produce a non-aqueous electrolyte secondary battery (battery F1) of a laminate type, as shown in FIG. 1, and having a rated capacity of 220 mAh.

Example 2

A positive electrode E2 and a battery F2 were produced by adjusting the first slurry C2 and the second slurry D2 in the same manner as in Example 1, except that a lamellar lithium transition metal oxide represented by the composition formula: $Li_{1.054}Ni_{0.199}Co_{0.597}Mn_{0.199}Zr_{0.005}O_2$ (first positive electrode active material A2) was used instead of the first positive electrode active material A1. The 100 nm or less pores volume of first positive electrode active material A2 was 8.1 mm$^3$/g, as measured according to the BJH method.

Example 3

A positive electrode E3 and a battery F3 were produced by adjusting a first slurry C3 and a second slurry D3 in the same manner as in Example 1, except that a lamellar lithium transition metal oxide represented by the composition formula: $Li_{1.067}Ni_{0.498}Co_{0.199}Mn_{0.299}Zr_{0.005}O_2$ (second positive electrode active material B2) was used instead of the second positive electrode active material B1. The 100 nm or less pores volume of second positive electrode active material B2 was 5 mm$^3$/g, as measured according to the BJH method.

Example 4

A first slurry C4 and a second slurry D4 were prepared in the same manner as in Example 1 so as to produce a positive electrode E4 and a battery F4, except that the first positive electrode active material A1 and the second positive electrode active material B1 were mixed at a mass ratio of 16:84 in the step of preparing the first slurry C1, and the first positive electrode active material A1 and the second positive electrode active material B1 were mixed at a mass ratio of 24:79 in the step of preparing the second slurry D1. In the positive electrode E4, the content of the first positive electrode active material A1 based on the total amount of the first positive electrode active material A1 and the second positive electrode active material B1 was 20 mass %. The surface-side content of the first positive electrode active material A1 in the positive electrode E4 was 60 mass %.

Example 5

A first slurry C5 and a second slurry D5 were prepared in the same manner as in Example 1 so as to produce a positive electrode E5 and a battery F5, except that the first positive electrode active material A1 and the second positive electrode active material B1 were mixed at a mass ratio of 24:76 in the step of preparing the first slurry C1, and the first positive electrode active material A1 and the second positive electrode active material B1 were mixed at a mass ratio of 36:64 in the step of preparing the second slurry D1. In the positive electrode E5, the content of the first positive electrode active material A1 based on the total amount of the first positive electrode active material A1 and the second positive electrode active material B1 was 30 mass %. The surface-side content of the first positive electrode active material A1 in the positive electrode E5 was 60 mass %.

Example 6

A first slurry C6 and a second slurry D6 were prepared in the same manner as in Example 1 so as to produce a positive electrode E6 and a battery F6, except that the first positive electrode active material A1 and the second positive electrode active material B1 were mixed at a mass ratio of 18:82 in the step of preparing the first slurry C1, and the first positive electrode active material A1 and the second positive electrode active material B1 were mixed at a mass ratio of 42:58 in the step of preparing the second slurry D1. In the positive electrode E6, the content of the first positive electrode active material A1 based on the total amount of the first positive electrode active material A1 and the second positive electrode active material B1 was 30 mass %. The surface-side content of the first positive electrode active material A1 in the positive electrode E6 was 70 mass %.

Example 7

A first slurry C7 and a second slurry D7 were prepared in the same manner as in Example 1 so as to produce a positive electrode E7 and a battery F7, except that the first positive electrode active material A1 and the second positive electrode active material B1 were mixed at a mass ratio of 30:70 in the step of preparing the first slurry C1, and the first positive electrode active material A1 and the second positive electrode active material B1 were mixed at a mass ratio of 30:70 in the step of preparing the second slurry D1. In the positive electrode E7, the content of the first positive electrode active material A1 based on the total amount of the first positive electrode active material A1 and the second positive electrode active material B1 was 30 mass %. The surface-side content of the first positive electrode active material A1 in the positive electrode E7 was 50 mass %.

Comparative Example 1

A first slurry C8 and a second slurry D8 were prepared in the same manner as in Example 1 so as to produce a positive electrode E8 and a battery F8, except that a lamellar lithium transition metal oxide represented by the composition formula: $Li_{1.054}Ni_{0.199}Co_{0.597}Mn_{0.199}Zr_{0.005}O_2$ (first positive electrode active material A3) was used instead of the first positive electrode active material A1 and that a lamellar lithium transition metal oxide represented by the composition formula: $Li_{1.067}Ni_{0.498}Co_{0.199}Mn_{0.299}Zr_{0.005}O_2$ (second positive electrode active material B3) was used instead of the second positive electrode active material B1. The 100 nm or less pores volume of the first positive electrode active material A3 was 6 mm$^3$/g, and the 100 nm or less pores volume of the second positive electrode active material B3 was 1.2 mm$^3$/g, as measured according to the BJH method.

Comparative Example 2

A first slurry C9 and a second slurry D9 were prepared in the same manner as in Example 1 so as to produce a positive electrode E9 and a battery F9, except that a lamellar lithium transition metal oxide represented by the composition formula: $Li_{1.054}Ni_{0.199}Co_{0.597}Mn_{0.199}Zr_{0.005}O_2$ (first positive electrode active material A4) was used instead of the first positive electrode active material A1, and a lamellar lithium transition metal oxide represented by the composition formula: $Li_{1.0676}Ni_{0.498}Co_{0.199}Mn_{0.299}Zr_{0.005}O_2$ (second positive electrode active material B2) was used instead of the second positive electrode active material B1. The 100 nm or less pores volume of the first positive electrode active material A4 was 16 mm$^3$/g, as measured according to the BJH method.

Comparative Example 3

A first slurry C10 and a second slurry D10 were prepared in the same manner as in Example 1 so as to produce a positive electrode E10 and a battery F10, except that the first positive electrode active material A1 and the second positive electrode active material B1 were mixed at a mass ratio of 32:68 in the step of preparing the first slurry C1, and the first positive electrode active material A1 and the second positive electrode active material B1 were mixed at a mass ratio of 48:52 in the step of preparing the first slurry D1. In the positive electrode E10, the content of the positive electrode active material A1 based on the total content of the first positive electrode active material A1 and the second positive electrode active material B1 was 40 mass %. The surface-side content of the first positive electrode active material A1 in the positive electrode E10 was 60 mass %.

Comparative Example 4

A positive electrode E11 and a battery F11 were produced in the same manner as in Embodiment 1, except that a first slurry C11 and a second slurry D11 were prepared only using the second positive electrode active material B1 without using the first positive electrode active material A1, in the step of producing the positive electrode E1.

Comparative Example 5

A positive electrode E12 and a battery F12 were produced in the same manner as in Embodiment 1, except that a first slurry C12 and a second slurry D12 were prepared only using the first positive electrode active material A1 without using the second positive electrode active material B1, in the step of producing the positive electrode E1.

[Durability Evaluation Test]

A durability test was carried out for each of the batteries F1 to F11 as above produced. 2000 charging/discharging cycles were repetitively carried out on each battery at a temperature of 60° C., a single charging/discharging cycle consisting of a constant current charging of a battery at a current of 1100 mA to 2.65 V, a quiescent period of 15 minutes, a constant current discharging of a battery at a current of 1100 mA to 1.5 V, and another quiescent period of 15 minutes.

Before and after the durability test, a DC resistance for each of the batteries F1 to F12 was measured. For each battery, after the constant current charging was carried out at a temperature of 25° C., at a current value of 220 mA to 1.5 V, the constant current charging was carried out at a current value 220 mA until the charging depth (SOC) became 50%. Based on this state, each battery was discharged at respective current values of 200 mA, 1000 mA, 2000 mA, 3000 mA for 10 seconds, and respective voltage values at the point after 10 seconds were measured. A current resistance value $R_{DC}$ was calculated from the following formula, where a change in current value was $\Delta I$ and a change in voltage value was $\Delta V$.

$$R_{DC} = \Delta V / \Delta I$$

For the respective batteries F1 to F12, durability for each battery was evaluated by calculating a DC resistance increasing rate after the durability test by dividing a DC current resistance value $R_{DC}$ after the durability test by a DC current resistance value $R_{DC}$ before the durability test.

For each battery, Table 1 shows: 100 nm or less pores volumes of the first and second positive electrode active materials; the first/second pore volume ratio; a content of the first positive electrode active material based on the total amount of the first positive electrode active material and the second positive electrode active material (content of the first positive electrode active material); the surface-side content of the first positive electrode active material; and the DC resistance increasing rate after the durability test.

TABLE 1

| | Battery No. | First positive electrode active material | | Second positive electrode active material | | First/second pore volume ratio | Content of first positive electrode active material (%) | Surface-side content of first positive electrode active material (%) | DC resistance increasing rate (%) |
| --- | --- | --- | --- | --- | --- | --- | --- | --- | --- |
| | | No. | 100 nm or less pores volume (mm³/g) | No. | 100 nm or less pores volume (mm³/g) | | | | |
| Example 1 | F1 | A1 | 20 | B1 | 2 | 10 | 10 | 60 | 17 |
| Example 2 | F2 | A2 | 8.1 | B1 | 2 | 4.05 | 10 | 60 | 18 |
| Example 3 | F3 | A1 | 20 | B2 | 5 | 4 | 10 | 60 | 16 |
| Example 4 | F4 | A1 | 20 | B1 | 2 | 10 | 20 | 60 | 15 |
| Example 5 | F5 | A1 | 20 | B1 | 2 | 10 | 30 | 60 | 14 |
| Example 6 | F6 | A1 | 20 | B1 | 2 | 10 | 30 | 70 | 13 |
| Example 7 | F7 | A1 | 20 | B1 | 2 | 10 | 30 | 50 | 17 |
| Comparative Example 1 | F8 | A3 | 6 | B3 | 1.2 | 5 | 10 | 60 | 24 |
| Comparative Example 2 | F9 | A4 | 16 | B2 | 5 | 3.2 | 10 | 60 | 23 |
| Comparative Example 3 | F10 | A1 | 20 | B1 | 2 | 10 | 40 | 60 | 22 |
| Comparative Example 4 | F11 | — | — | B1 | 2 | — | 0 | — | 25 |
| Comparative Example 5 | F12 | A1 | 20 | — | — | — | 100 | — | 42 |

As is clear from the results of Table 1, it has been confirmed that, as compared to the batteries F8 to F12, the DC resistance increasing rate after the charge/discharge cycle durability test was reduced at a lower level in the batteries F1 to F7 produced by using the positive electrodes E1 to E7, each of which contains the first positive electrode active material having a 100 nm or less pores volume of 8 mm³/g or more, and the second positive electrode active material having a 100 nm or less pores volume of 5 mm³/g or less, has a first/second pore volume ratio of 4 or more, and has a content of the first positive electrode active material of 30 mass % or less based on the total amount of the first positive electrode active material and the second positive electrode active material, and also using the negative electrodes, each containing a lithium-titanium composite oxide as the negative electrode active material. As described above, in the non-aqueous electrolyte secondary battery 10, which includes: the positive electrode 20 including the positive electrode mixture layer that contains the first positive electrode active material having a 100 nm or less pores volume of 8 mm³/g or more and the second positive electrode active material having a 100 nm or less pores volume of 5 mm³/g or less, having a first/second pore volume ratio of 4 or more, and having a content of the first positive electrode active material of 30 mass % or less based on the total amount of the first positive electrode active material and the second positive electrode active material; the negative electrode 30 containing a lithium-titanium composite oxide as the negative electrode active material; and the non-aqueous electrolyte, the resistance increase after the high-rate charge/discharge cycle durability test is suppressed at a lower level, and a remarkable excellent durability is exhibited.

Among the batteries F1 to F7, each of the batteries F5 and F6 having a surface-side content of the first positive electrode active material of 60 mass % or more exhibits a lower DC resistance increasing rate, and exhibits a superior durability against high-rate charge/discharge cycles, compared to the battery F7 produced in the same manner except that the surface-side content of the first positive electrode active material was less than 60 mass %.

REFERENCE SIGNS LIST 10 non-aqueous electrolyte secondary battery
11 battery case
12 electrode assembly
13 housing part
14 sealed part
15 positive electrode terminal
16 negative electrode terminal
20 positive electrode
30 negative electrode
40 separator

The invention claimed is:

1. A non-aqueous electrolyte secondary battery comprising:
   a positive electrode having a positive electrode mixture layer containing a first positive electrode active material and a second positive electrode active material;
   a negative electrode containing a lithium-titanium composite oxide as a negative electrode active material; and
   a non-aqueous electrolyte, wherein
   the first positive electrode active material has a pore volume, of pores each having a pore diameter of 100 nm or less, per mass of 8 mm³/g or more,
   the second positive electrode active material has a pore volume, of pores each having a pore diameter of 100 nm or less, per mass of 5 mm³/g or less,
   the pore volume, of pores each having a pore diameter of 100 nm or less, per mass of the first positive electrode active material is 4 or more times the pore volume, of pores each having a pore diameter of 100 nm or less, per mass of the second positive electrode active material, and
   the content of the first positive electrode active material is 30 mass % or less based on the total amount of the first positive electrode active material and the second positive electrode active material.

2. The non-aqueous electrolyte secondary battery according to claim 1, wherein the content of the first positive electrode active material contained in a region ranging from the surface to the center in the thickness direction of the positive electrode mixture layer is 60 mass % or more based on the total amount of the first positive electrode active material contained in the positive electrode mixture layer.

3. The non-aqueous electrolyte secondary battery according to claim 1, wherein both the first positive electrode active material and the second positive electrode active material are lamellar lithium transition metal oxide represented by a general formula (1): $Li_{1+x}M_aO_{2+b}$, wherein x, a, and b meet conditions: a=1, −0.2≤x≤0.4, and −0.1≤b≤0.4, and M represents a metal element including at least one element selected from the group consisting of Ni, Co, Mn, and Al.

* * * * *